(12) United States Patent
Rozic et al.

(10) Patent No.: US 8,286,348 B2
(45) Date of Patent: Oct. 16, 2012

(54) METHOD OF MANUFACTURING AND REFINISHING INTEGRALLY BLADED ROTORS

(75) Inventors: Marjan Rozic, Augsburg (DE); Dariusz Nowak, Farmington, CT (US); Derek Waszczuk, Newington, CT (US)

(73) Assignee: MTU Aero Engines GmbH, Munich (DE)

( * ) Notice: Subject to any disclaimer, the term of this patent is extended or adjusted under 35 U.S.C. 154(b) by 999 days.

(21) Appl. No.: 12/234,961

(22) Filed: Sep. 22, 2008

(65) Prior Publication Data
US 2010/0074704 A1   Mar. 25, 2010

(51) Int. Cl.
*B23C 3/18*   (2006.01)
*B23P 15/02*   (2006.01)
(52) U.S. Cl. ........ 29/889.23; 29/889.7; 29/558; 29/424; 29/423; 416/500; 415/119; 264/266; 264/269
(58) Field of Classification Search ............... 29/23.51, 29/889.23, 889.7, 889.71, 889.72, 889.721, 29/558, 423, 424; 416/500, 229 R, 229 A, 416/230; 415/119; 264/266, 269, 267
See application file for complete search history.

(56) References Cited

U.S. PATENT DOCUMENTS

| | | | |
|---|---|---|---|
| 995,537 A * | 6/1911 | Hertner et al. .................... 269/7 |
| 2,480,807 A * | 8/1949 | De Vlieg .......................... 409/84 |
| 2,633,776 A * | 4/1953 | Schenk .......................... 409/132 |
| 2,703,511 A * | 3/1955 | Griner ............................ 409/198 |
| 2,898,442 A * | 8/1959 | Anderson et al. ................ 219/80 |
| 2,962,941 A * | 12/1960 | Stein et al. ...................... 409/122 |
| 3,176,387 A * | 4/1965 | Argueso, Jr. et al. ........... 29/423 |
| 3,262,196 A * | 7/1966 | Davis ............................. 228/117 |
| 3,811,163 A | 5/1974 | Frederick et al. |
| 4,156,306 A * | 5/1979 | Seidel et al. ..................... 29/423 |
| 4,942,653 A * | 7/1990 | Hawkinson ................ 29/890.01 |
| 6,077,002 A * | 6/2000 | Lowe ............................. 409/132 |
| 6,363,612 B1 * | 4/2002 | Roberts et al. ................ 29/889.1 |
| 6,869,259 B2 * | 3/2005 | Lebkuechner ................ 409/132 |
| 6,905,312 B2 * | 6/2005 | Bourgy et al. ................. 416/234 |
| 7,225,539 B2 * | 6/2007 | Nowak et al. ............... 29/889.23 |
| 7,637,010 B2 * | 12/2009 | Burgess et al. ............. 29/889.23 |
| 7,716,802 B2 * | 5/2010 | Stern et al. ...................... 29/423 |
| 2010/0212158 A1 | 8/2010 | Heinrich et al. |

FOREIGN PATENT DOCUMENTS
GB   584282   1/1947
* cited by examiner

*Primary Examiner* — David Bryant
*Assistant Examiner* — Jason L Vaughan
(74) *Attorney, Agent, or Firm* — Crowell & Moring LLP

(57) ABSTRACT

A method of forming integrally bladed rotors for gas turbines is described. The method includes drilling in a workpiece material recesses defining flow passages and rotor blades, performing a coarse milling step to refine surfaces of the rotor blades, and filling the recesses between the rotor blades with a damping material, thus encasing the rotor blades in the damping material. The method further includes performing a finishing milling step to remove the damping material and the workpiece material on surfaces of the rotor blades, while maximizing a damping effect of the damping material on the rotor blades. To maximize the damping effect, the finishing milling tool moves along a path that preferentially mills one surface of a blade while the other surface is in contact with the damping material.

15 Claims, 5 Drawing Sheets

METHOD OF MANUFACTURING AND REFINISHING INTEGRALLY BLADED ROTORS

FIELD OF THE INVENTION

The present invention relates to a method for the manufacture of machinery components made of difficult-to-cut materials, especially requiring accurate adherence to complex shapes and surface finishing. More specifically, the invention relates to manufacturing integrally bladed rotors for gas turbines, by forming in a block of material multiple recesses defining flow passages, each of the recesses having side walls, the side walls defining surfaces of the blades.

BACKGROUND AND SUMMARY OF THE INVENTION

Integrally bladed rotors (IBR's) for gas turbines are often called "blisks" or "blings", depending on the cross-sectional shape of the rotor. A disk-shaped rotor having integrated blades is called "blisk" (bladed disk), a ring-shaped rotor having integrated blades is called "bling" (bladed ring). IBR's are formed from a single piece of material that includes the hub, the disk and all the rotor blades, in contrast to conventional rotors in which multiple individual blades, formed separately from the hub and disk, are mounted on the disk using a mechanical connection.

Several conventional methods for the manufacture of integrally bladed rotors have been used. These methods include milling methods as well as chemical or electrochemical discharge methods to remove material from portions of the material to define flow channels and blades. One example of a conventional milling method for the manufacture of integrally bladed rotors is disclosed in the U.S. Pat. No. 6,077,002. Conventional manufacturing methods for IBR's tend to be difficult and time consuming to carry out, and often require manual finishing steps, resulting in an expensive manufacturing process for integrally bladed rotors.

The present invention provides a method for the manufacture of components for gas turbines made of difficult-to-cut materials, by forming recesses with one or more side walls in a workpiece block of the material. The exemplary method is well suited for manufacturing integrally bladed rotors used in compressor and turbine stages of gas turbines, especially for use in aircrafts engines. The recesses formed according to the exemplary method define the flow passages between the rotor blades, and the side walls of the recesses define the opposing concave and convex surfaces of adjacent rotor blades. Accordingly, the contours of the recesses define the airfoil shape of the blade surfaces, and thus the radial cross section of the flow path between the blades. IBR's are well suited for use in axial flow compressors and turbines of aeronautical engines, however, other applications may also be envisioned that would benefit from the manufacturing methods of the present invention.

Material in the region of the flow channels is initially removed, according to an exemplary embodiment of the invention, by a drilling process. After the drilling process is completed, the removal of material in the region of the flow channels continues with an initial milling process, which more accurately defines the shape of the blade surfaces. These two initial drilling and milling steps are similar to the steps described in U.S. Pat. No. 7,225,539, which is hereby incorporated by reference in its entirety. The combination of a drilling process followed by a milling process for material removal reduces significantly the manufacturing time and results in a less expensive manufacturing of the IBR's than other manufacturing processes. However, after these steps the blades are still not sufficiently smooth and their shape is not sufficiently accurate to be ready for use.

To refinish the blades, an additional finishing milling step is carried out according to exemplary embodiments of the present invention. This step takes place after filling the nearly formed flow passages with a dampening material. This additional milling step produces blades that have the desired accurate shape, and the desired surface finish. A benefit of the exemplary method according to the invention is that there is no need for any manual steps in finishing the blades, such that the entire IBR manufacturing process is automated.

In accordance with an exemplary embodiment of the present invention, the drilling process may be carried out in such a way that a drilling tool removes material in a flow-wise direction from the flow passages between pairs of blades to be formed in the workpiece material. In an IBR, the shape of the flow passage between two adjacent blades may vary considerably in the radial direction, from the hub to the tip of the blades. Accordingly, multiple flow channels may be defined in the radial direction within each flow passage, between hub and tip. According to the invention, the axis of the drill-holes may be computed for each radially distinct flow channel, and may be selected to be approximately parallel to the flow direction through that flow channel. For each flow channel, at least one center line of the flow channel may be calculated, for example from the contours of the side-walls defining the flow channel, which correspond to the opposing surfaces of two adjacent blades.

The exemplary drilling process is performed so that the axis of each drill-hole is approximately parallel to the center line that approximates the center of the flow channel to be manufactured. For example, an inlet-side opening of each drill-hole may be located adjacent to the leading-edges of the blades defining the flow channel to be manufactured, and the outlet-side opening of each drill-hole may be located adjacent to the trailing-edges of the blades defining the flow channel. Those of skill in the art will understand that the drill holes may be started at the trailing edge, and may extend to the leading edge.

Alternatively, according to another exemplary embodiment of the present invention, the drilling process may be performed in a way that a drilling tool removes material in a cross-flow direction of each flow channel. In this case, the axis of the drill-holes may be approximately perpendicular to the flow direction through the flow channel to be manufactured. The drilling tool thus removes material by drilling holes starting from the outside diameter of the rotor, at the tip, generally in a radial direction towards a hub of the rotor. The center line of the flow channel may be determined as explained above, and the drill may be operated in a generally perpendicular direction to the center line.

Following completion of the drilling process, as described above, the removal of material to form the flow passages may continue with an initial milling process. In this step according to an exemplary embodiment of the invention, a milling tool is used to remove additional material that remains around the blades after the drilling process. This step defines more accurately the shape of the flow passages and of the surfaces of the blades defining the flow passages. The blade resulting after this initial or coarse milling step is still rough, and does not have a sufficiently accurate shape and sufficiently smooth surface to be used in the turbine engine.

In one exemplary embodiment, the initial milling step is carried out along an axis of the milling tool or cutter that is generally perpendicular to the center line approximating the center of the flow channel being manufactured. For example, the milling tool may operate along a generally radial axis, so that it extends from the tip towards the root of the blades. The milling tool may be moved along the concave and the convex surfaces of each blade, and around the leading edge and trailing edge thereof, to remove excess material and more accurately shape the blades and the flow channel.

Because the initial milling step does not produce blades that are ready for use, an additional step is carried out, according to exemplary embodiments of the invention, to produce a better finish and a more accurate shape for the blades. For example, mismatches, waviness and chatter due to the flow-wise drilling and initial milling sequence may be removed or reduces by the additional finishing milling step. This additional automated step removes the need to manually finish the blades after the initial drilling and milling steps, and also increases the accuracy and quality of the finish. According to exemplary embodiments of the invention, the additional step may be an I-flow milling process, in which the finishing milling step is carried out after a damping material is used to fill all the flow passages between the blades.

Prior to the finishing milling step, the rough shape of the blades and of the flow passages are already defined. A damping material is then inserted in the flow passages, between adjacent pairs of blades, to completely surround each of the compressor or turbine blades. This material, for example, may dampen vibrations of the blades during machining. The milling cutter tool is then used to refinish the blade surface, removing both the damping material and the blade material to produce a smooth and accurate shape of the blade surfaces.

In one exemplary embodiment, the milling tool is moved along one surface of a first blade defining the flow path, then across the flow path and along the opposite surface of the adjacent blade. The milling procedure may start at the leading edge, concave side of a blade, travel along the concave surface of the blade to the trailing edge, move across to flow passage to the convex side of the adjacent blade, and then travel to its leading edge along the convex surface. The opposite routing of the milling tool may also be used to obtain substantially the same results. The milling tool may be moved as explained above to ensure that for each blade, at least one surface is milled while the opposite surface is still encased in the damping material, to reduce or prevent vibration and deflection of the blade that may result in an inadequate blade finish. According to embodiments of the invention, the path of the milling tool is selected to maximize the damping effect of the damping material, by delaying the removal of the material from one side of the blade while the other side is being finished. Thus, to maximize the damping effect, the finishing milling tool may move along a path that preferentially mills one surface of a blade while the other surface of the same blade is in contact with the damping material.

Other objects, advantages and novel features of the present invention will become apparent from the following detailed description of the invention when considered in conjunction with the accompanying drawings

DETAILED DESCRIPTION

Figure 1:
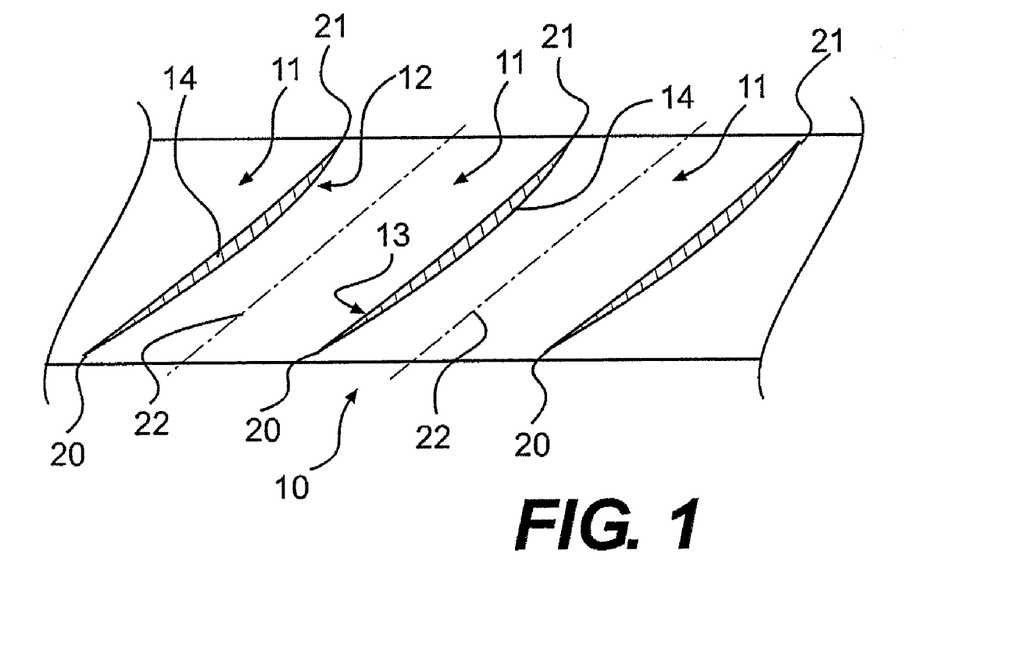
FIG. 1: is a cross sectional view on a constant radius of a row of blades of an integrally bladed rotor, showing three blades in a first radial position.
Figure 2:
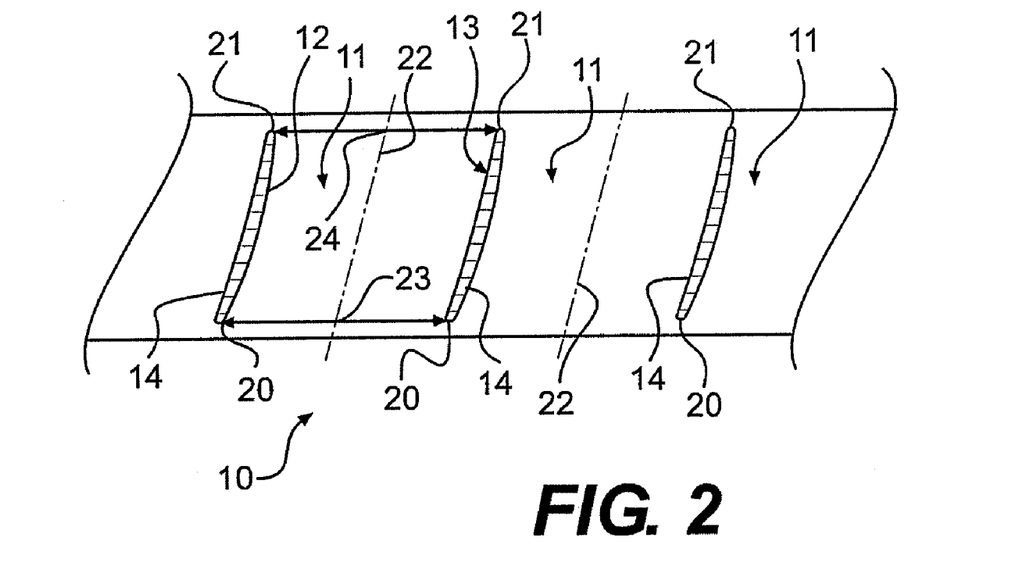
FIG. 2: is a cross-sectional view on a constant radius of the integrally bladed rotor shown in FIG. 1, showing the three blades at a second radial position.

FIGS. 1 and 2 show a radial cross sectional view of an exemplary component of a gas turbine which is manufactured as an integrally bladed rotor 10. According to the present invention, a method is provided for manufacturing such an integrally bladed rotor 10, that is formed of materials that are difficult-to-cut and to machine, such as, for example, nickel alloys or titanium alloys. These materials are typically used in the manufacture of compressor and turbine blades of gas turbines, particularly for aircraft propulsion applications. However, other applications for the machining methods according to the invention may also be envisioned, in which components with complex shapes have to be manufactured from materials that are difficult to machine.

The exemplary integrally bladed rotor 10 is manufactured by initially forming recesses 11 between two opposite side-walls 12, 13, in a workpiece block. The two opposite side-walls 12, 13 form opposing surfaces of two adjacent blades 14. For example, one of the side-walls may form the concave side of one blade, while the other forms the convex side of an adjacent blade. In the case of a compressor, these correspond to the pressure and suctions sides of the blade, respectively. The side-walls 12, 13 thus define blade surfaces, and the recesses 11 define flow passages located between the adjacent individual blades 14.

Those of skill in the art will understand that the present exemplary method is not limited to the manufacture of IBR's for gas turbine engines, but may be applied to the manufacture of other machined components formed from a workpiece block of material, in particular of materials that are difficult to machine. For example, any machined element having solid portions separated by recesses may benefit from the invention. In addition to turbine and compressor blades, other elements with spokes, peripheral protrusions or other types of radial projections, for example, may be refinished according to the present invention. The machined element is also not limited to a circular configuration, but may also extend linearly, as in a ladder-like element or other linear device having recesses separating solid portions.

FIGS. 1 and 2 show different cross sectional views of the blades 14, taken at different radial heights. As shown in the figures, the shape of the flow channels and the contours of the blades 14 vary considerably in the radial direction, and are generally a function of the radial position between the hub and the tip of the blades defined by the side walls 12, 13.

According to exemplary embodiments of the present invention, the recesses 11 between the blades 14, which define the flow passages between adjacent blades, are formed by first removing material from the work piece in the selected region by a drilling process. After the drilling process is completed, the removal of additional material in the region of said recesses 11 continues by way of a milling process, which further refines the shape of the blades and thus of the flow passages therebetween. According to the invention, the removal of the material in the region of the channels 11, up to this point, is carried out by a combination of a drilling process and an initial coarse milling process, whereby the coarse milling process takes place after the drilling process is completed.

After the initial coarse milling process is completed, the concave and convex surfaces of the blades 14 are not sufficiently smooth and accurately defined to be usable in a gas turbine engine, in particular one used for aviation applications. Additional steps are conventionally used to refinish the blades, such as performing additional machine or hand polishing of the blade surfaces to remove step over, mismatches, waviness and chatter, which commonly result form the preceding machining steps.

According to the exemplary embodiments of the invention, these additional steps are superseded by a finishing milling process, that removes any flaws on the blades that are left over by the drilling and coarse milling steps, and results in a smooth and accurate blade and corresponding flow passage. According to an aspect of the invention, the second or finishing milling step that is carried out is referred to as the I-flow milling process.

A damping material is placed between the blades, in the semi-finished flow passages, before the finishing milling step. The damping material is used to limit or prevent the vibration and deformation of the blades that occurs during machining, and which may result in the flaws described above.

A first preferred embodiment of the method according to the present invention will now be described in greater detail with reference to the drawings. According to this exemplary embodiment of the invention, the drilling process is performed in a way that the material is removed in a flow-wise direction, for each flow channel or recess 11.

Figure 3:
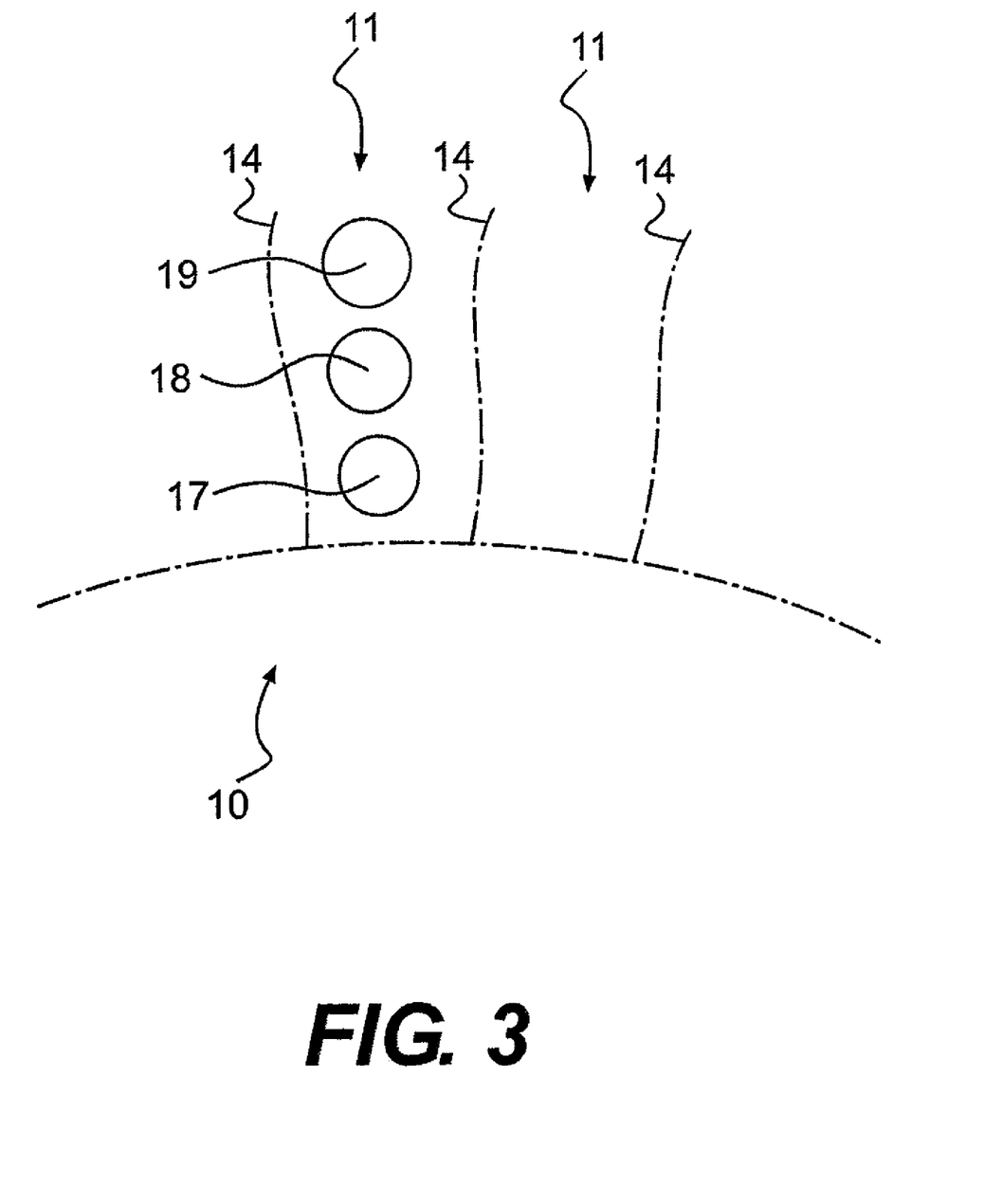
FIG. 3: is an axial view of the integrally bladed rotor shown in FIGS. 1-2, illustrating a drilling step of the manufacturing method according to an exemplary embodiment of the invention.

According to the invention, a drilling tool (not shown) removes material by drilling drill-holes 17, 18 and 19 into the material, as shown in FIG. 3. The drilling of the drill-holes 17, 18 and 19 may be started at an angled surface oriented generally perpendicular to the flow channel to be formed. The angled surface may be disposed at a position corresponding to one of the leading or trailing edges of the blades 14. The drilling of the drill-holes 17, 18 and 19 begins at that surface, continues generally in the flow-wise direction of the flow channel to be manufactured, and terminates in a region corresponding to the other of the leading or trailing edge of the blades 14.

To determine the drilling-direction for the drilling step, thus the axis of each drill-hole 17, 18 and 19, at least one center line for each flow channel is determined. For example, the center lines 22 shown in FIGS. 1 and 2 may be computed from the contours of the opposite side-walls 12, 13 defining the recess or flow channel to be manufactured. The exemplary center lines 22 are calculated for each pair of blades 14, from the contours of the side-walls 12, 13, at various radial positions within the flow passage. The orientation of these centerlines 22 typically varies in the radial direction, along a radial length of the blades.

The exemplary center lines 22 shown in FIG. 2 may be defined by two points 23 and 24, related to the half distance between the surfaces of the side-walls 12, 13, for example near the leading and trailing edges 20, 21. The orientation of the center lines 22 may be a function of the radial position or radial height within the side-walls 12, 13, thus must be calculated for each of the flow channels being defined within the flow passage. Those of skill in the art will understand that the orientation and location of the center line 22, and thus of the axis of drilling, may be calculated using other methodologies that may approximate the direction of fluid flow within the recess 11 which defines the flow channel. The drill holes may be drilled starting from one of the leading edge or training edge regions of the recess 11, and continue along the corresponding center line 22 towards an outlet opening of the drill-holes 17, 18, 19.

Figure 4:
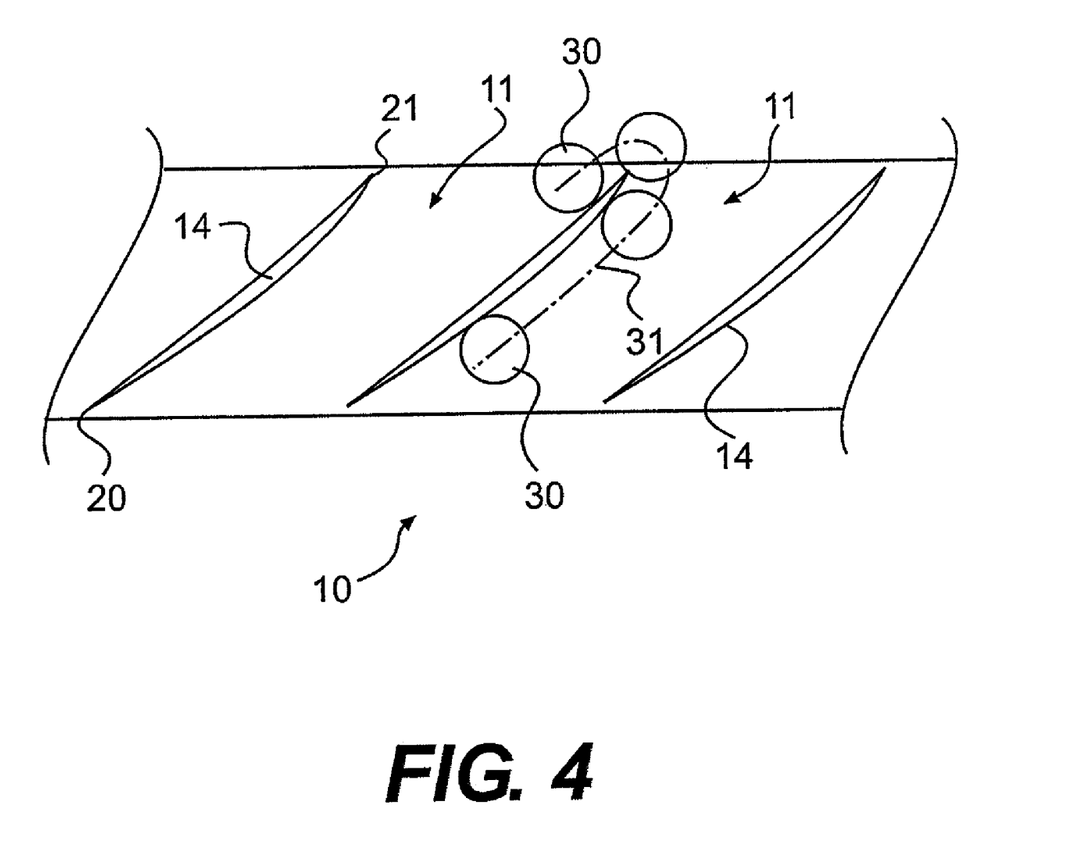
FIG. 4: is a constant radius cross sectional view of the integrally bladed rotor according to FIGS. 1-3, illustrating a first coarse milling step of the manufacturing method according to the exemplary embodiment of the invention.

As shown in FIG. 3, a plurality of exemplary drill-holes 17, 18 and 19 may be drilled for each recess 11 defining a flow passage. The size, pattern and the orientation of the drilling axis of each of the drill-holes 17, 18 and 19 may depend on the radial height from the hub 50, and may be a function of the shape of the recesses 11 and/or from the contours of the side-walls 12, 13 of the blades 14. For example, as shown in FIG. 3, the diameter of the drill-holes 17, 18 and 19 may be the same radially. However, in other embodiments the diameter of the drill-holes may vary. In one exemplary embodiment, the diameter of the drill-holes located where there is a large distance between adjacent blades, such as at the tip 52, may be greater than the diameter of the drill holes located where the blade surfaces are closer to one another, such as at the hub 50 or platform of the blades Following the drilling process in the flow-wise direction of each flow channel or recess 11, removal of additional material in the region of the recesses 11 continues using an initial coarse milling process. As shown in FIG. 4, a milling tool 30 is used to remove material around the blades 14, and an exemplary movement of the milling tool 30 around one blade is shown by the line 31. The milling tool 31 may be oriented in such a way that its axis is approximately aligned with a radial direction of the rotor 10. The precise orientation of the milling tool may depend on the shape of the blades 14, and how the airfoil shape of those blades varies along the radial direction. For example, the axis of the milling tool may have to account for the considerable twist that exists between the root and tip sections of a compressor or turbine blade.

Figure 5:
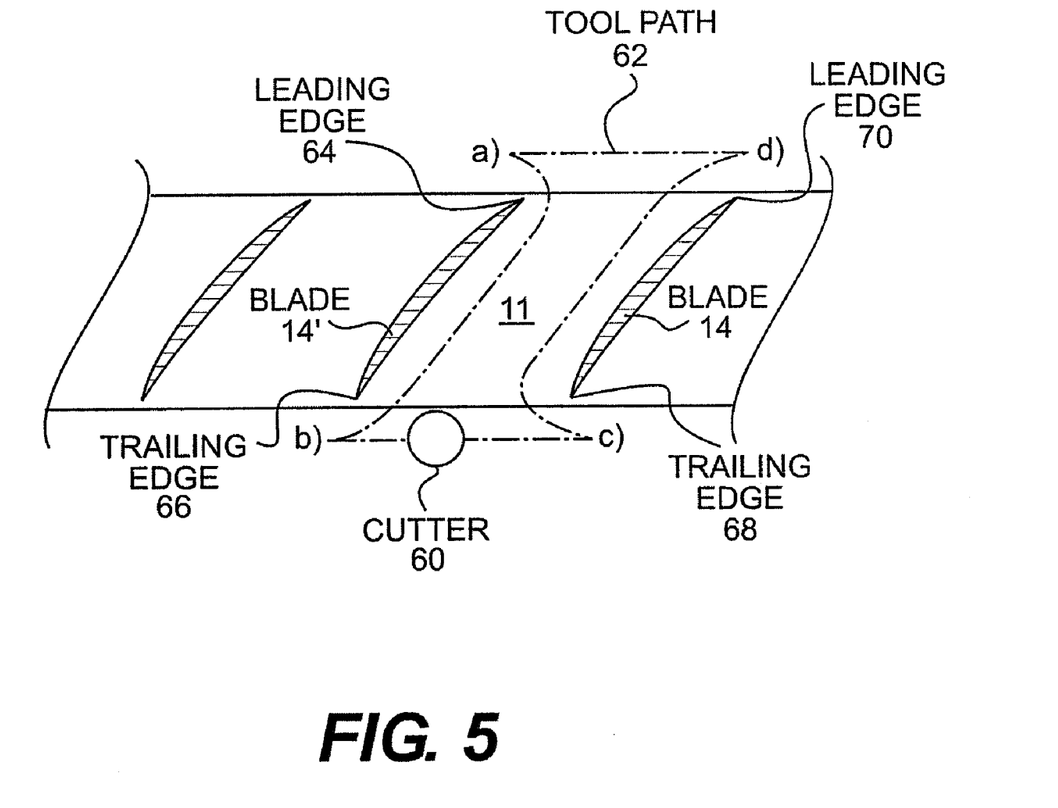
FIG. 5: is a constant radius cross sectional view of a second finishing milling step of the manufacturing method illustrated in FIGS. 1-4 according to the exemplary embodiment of the invention.
Figure 6:
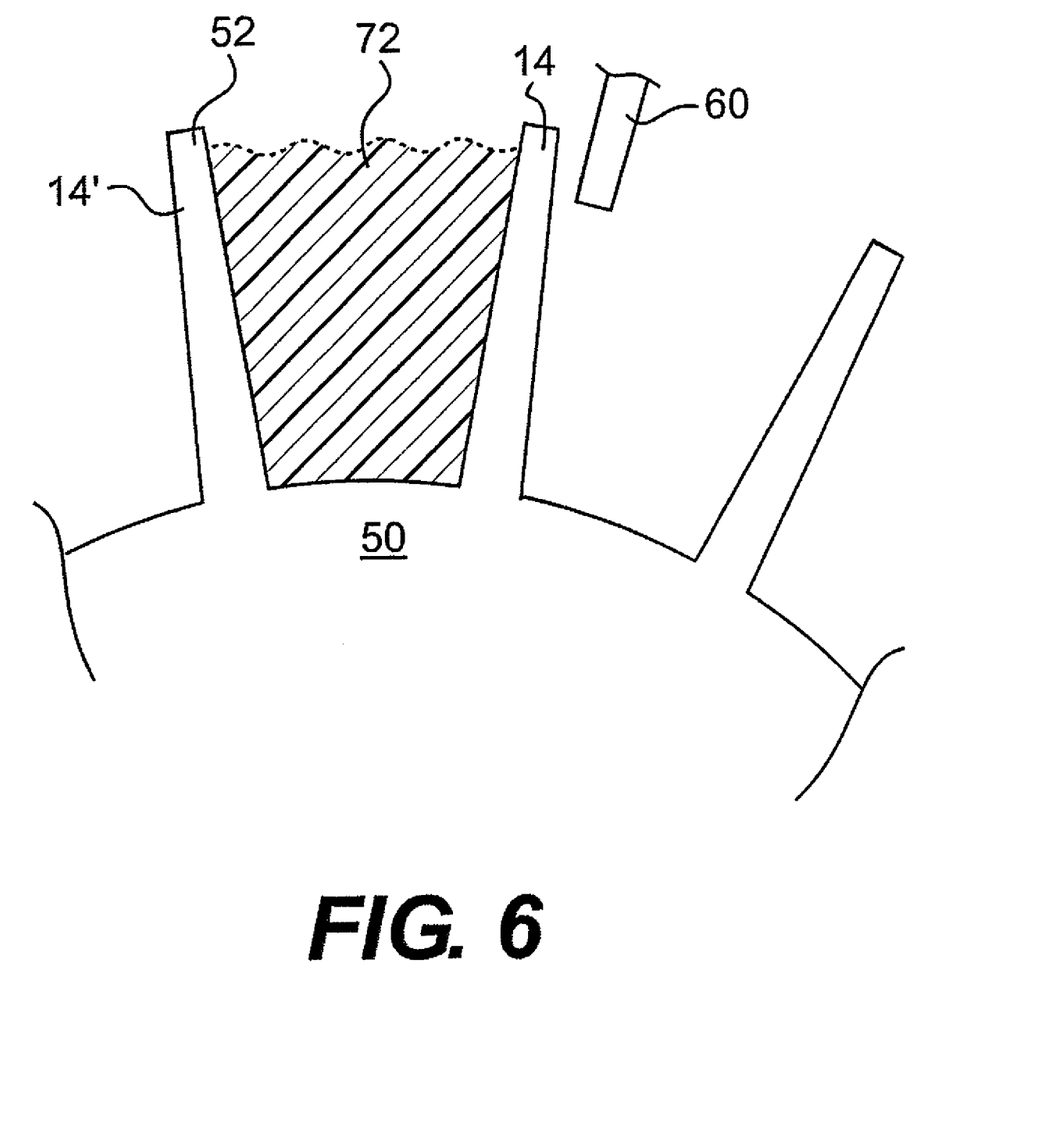
FIG. 6 is an axial view of the integrally bladed rotor shown in FIG. 5, illustrating the finishing milling step and the damping material disposed in the flow passages.

As explained above, the blade after the two initial drilling and coarse milling steps is not sufficiently finished for use in a gas turbine. A further finishing milling step is carried out, according to the invention, to refinish the surface of the blades, and to ensure that the airfoil shape of every blade conforms to the design intent. FIGS. 5 and 6 show details of an exemplary finishing milling step, according to an embodiment of the invention.

A flow passage defined by the recess 11 is formed by the initial steps between a pair of blades 14, 14'. A damping material 72 is disposed in the recesses that form the flow passages between the opposing surfaces of the blades, so that the two blades 14, 14' are encased in the damping material 72. For example, the damping material 72 may be Araldite™ manufactured by Huntsman Advanced Materials. The damping material 72 is designed to control or prevent the vibration and deflection of the blades 14. 14' while each blade is being machined. The combination of encasing the blades in the damping material, and performing the finishing milling in an appropriate sequence along the blades, results in avoiding the waviness, chatter, and other defects that result from machining undampened blades.

In one exemplary embodiment, the finishing milling tool 60 may be oriented in a generally radial direction within the recess 11, as shown in FIG. 6, and may follow a path 62. The path 62 is designed to ensure that each blade 14 being machined is at least partially encased in the damping material 72 for a majority of the machining time. In one exemplary embodiment, the path 62 may begin at the leading edge 64 of blade 14', at position (a), follow the concave side of the blade 14' to the trailing edge 66, at position (b), and then continue across the flow passage to position (c), at the trailing edge 68 of the second blade 14. The path of the milling tool then continues along the convex side of the blade 14 to its leading edge 70, at position (d). Alternatively, the path of the milling tool 60 may be reversed, going from position (d) to position (a).

Those of skill in the art will understand that different paths of the finishing milling tool 60 may be devised, which provide the desired damping material on a sufficient portion of each blade while it is being machined. In addition, the milling axis of the milling tool may be generally radial, or may have another orientation that places the milling tool substantially parallel to the surface of the blade or other element being finished.

After the finishing milling step is completed, the blades have a sufficiently finished surface and conform to their desired shape. A tumbling step in which the blades are tumbled together with some polishing elements may be further applied, to further polish their surface. However, no manual intervention of the operator is necessary, as the entire manufacture of the IBR's is automated.

Because the entire process of drilling, coarse and finishing milling and any eventual final polishing steps is automated, all the blades are the same. Any variation due to polishing and finishing by hand is avoided, so that a more consistent and higher quality product can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for finishing machined components, comprising the acts of:
    providing machined recesses in a workpiece material, the recesses having side walls defining surfaces of solid portions of the machined component;
    disposing a damping material in the recesses between the solid portions of the machined component, in contact with such solid portions;
    selecting a finishing milling axis that places a finishing milling tool substantially parallel to surfaces of the solid portions; and
    removing by milling the damping material and the workpiece material to finish the surfaces, along the selected finishing milling axis, while moving the finishing milling tool along a path with an end at a leading edge of a first solid portion, along a surface and to a trailing edge of the first solid portion, across the recess to a trailing edge of a second solid portion, and along an opposing surface of the second solid portion to a second end at the leading edge thereof.

2. The method according to claim 1, further comprising machining the recesses using a drilling step and a coarse milling step.

3. The method according to claim 1, further comprising defining recesses of the workpiece that form blades of an integrally bladed rotor of a gas turbine.

4. The method according to claim 1 wherein the first solid portion is a first blade and wherein the surface is a concave side of the first blade, and wherein the second solid portion is a second blade and wherein the opposing surface is a concave side of the second blade.

5. The method according to claim 1, wherein the workpiece material comprises one of a nickel alloy and a titanium alloy.

6. The method according to claim 2, wherein the finishing milling tool removes mismatches, waviness and chatter due to the drilling step and the coarse milling step.

7. A method of forming integrally bladed rotors for gas turbines, comprising the acts of:
    drilling in a workpiece material recesses defining flow passages and rotor blades;
    performing a coarse milling step to refine surfaces of the rotor blades;
    filling the recesses between the rotor blades with a damping material, thus encasing the rotor blades in the damping material; and
    performing a finishing milling step to remove the damping material and the workpiece material on surfaces of the rotor blades, wherein the finishing milling step includes moving a finishing milling tool along a surface of a first blade, across a flow passage, and along an opposing surface of a second adjacent blade.

8. The method according to claim 7, wherein the finishing milling step includes moving the finishing moving tool along the surface of the first blade in a first direction between a leading edge and a trailing edge thereof, and moving along the opposing surface of the second adjacent blade in an opposite direction between the leading edge and the trailing edge thereof.

9. The method according to claim 7, further comprising orienting the finishing milling tool to be substantially parallel to surfaces of the rotor blades.

10. The method according to claim 7, further comprising drilling the recesses to define one of turbine blades and compressor blades of the gas turbine.

11. A method of forming integrally bladed rotors for gas turbines, comprising the acts of:
    drilling in a workpiece material recesses defining flow passages and rotor blades;
    performing a coarse milling step to refine surfaces of the rotor blades;
    filling the recesses between the rotor blades with a damping material, thus encasing the rotor blades in the damping material; and
    performing a finishing milling step by a finishing milling tool to remove the damping material and the workpiece material on surfaces of the rotor blades by moving the finishing milling tool along a path resulting in that, when a first surface of a rotor blade is milled, a second surface of the rotor blade is encased in the damping material.

12. The method according to claim 7, wherein the drilling of the workpiece material is done in a drilling direction generally along a flow direction through the flow passages.

13. The method according to claim 7, wherein the coarse milling is done around each rotor blade, between a leading edge and a trailing edge thereof, along a concave and a convex surface thereof.

14. The method according to claim 7, wherein the workpiece material comprises one of a nickel alloy and a titanium alloy.

15. A method for manufacturing rotor blades, comprising:
    a drilling step for forming in a workpiece material recesses defining flow passages and blade surfaces of blades separating adjacent flow passages, the drilling being generally along a flow direction of the flow passages;
    a coarse milling step following the drilling step, for further defining shapes of the blades and of the flow passages;

a damping step, for filling the flow passages with a damping material to reduce movement of the blades in subsequent machining steps; and a finishing milling step, along a milling axis generally perpendicular to the flow direction, for finishing surfaces of the blades by milling the damping material and the workpiece material from opposing blade surfaces defining each of the flow passages, wherein the finishing milling step includes moving a finishing milling tool along a path to result in that, when a first surface of each rotor blade is milled, a second surface of the same rotor blade is encased in the damping material.

* * * * *